United States Patent [19]
Murphy

[11] Patent Number: 5,108,182
[45] Date of Patent: Apr. 28, 1992

[54] DIGITAL PATH LENGTH CONTROL FOR RING LASER GYROS

[75] Inventor: Hugh J. Murphy, Placentia, Calif.

[73] Assignee: Rockwell International Corporation, El Segundo, Calif.

[21] Appl. No.: 507,538

[22] Filed: Apr. 11, 1990

[51] Int. Cl.⁵ ............................................. G01C 19/66
[52] U.S. Cl. ..................................................... 356/350
[58] Field of Search ............................ 356/350; 372/94

[56] References Cited

U.S. PATENT DOCUMENTS

| | | |
|---|---|---|
| 3,715,562 | 2/1973 | Dendy et al. |
| 3,896,362 | 7/1975 | Street |
| 4,132,940 | 1/1979 | Schindler |
| 4,320,974 | 3/1982 | Ljung ................................... 356/350 |
| 4,740,083 | 4/1988 | Curby et al. ....................... 356/350 |
| 4,740,085 | 4/1988 | Lim |
| 4,801,206 | 1/1989 | Benoist |

Primary Examiner—Samuel Turner
Attorney, Agent, or Firm—H. Fredrick Hamann; George A. Montanye; Tom Streeter

[57] ABSTRACT

A digital path length control for ring laser gyros comprises a square wave generator, a dither counter (driven by the generator with a quarter cycle delay, a dither DAC, a control counter, a control DAC, and a PZT driven by the two DACs. The PZT controls the path length of the ring laser gyro, and thus controls the intensity of the light in the gyro. A photodetector samples this light and produces an ac signal, which a voltage comparator compares with ground. The output of the comparator is XORed with the square wave, and the output of the XOR gate drives the control counter, strobed with a frequency at least twice that of the square wave. All signal processing is digital, and analog conversion is made only when interfacing the gyro.

3 Claims, 6 Drawing Sheets

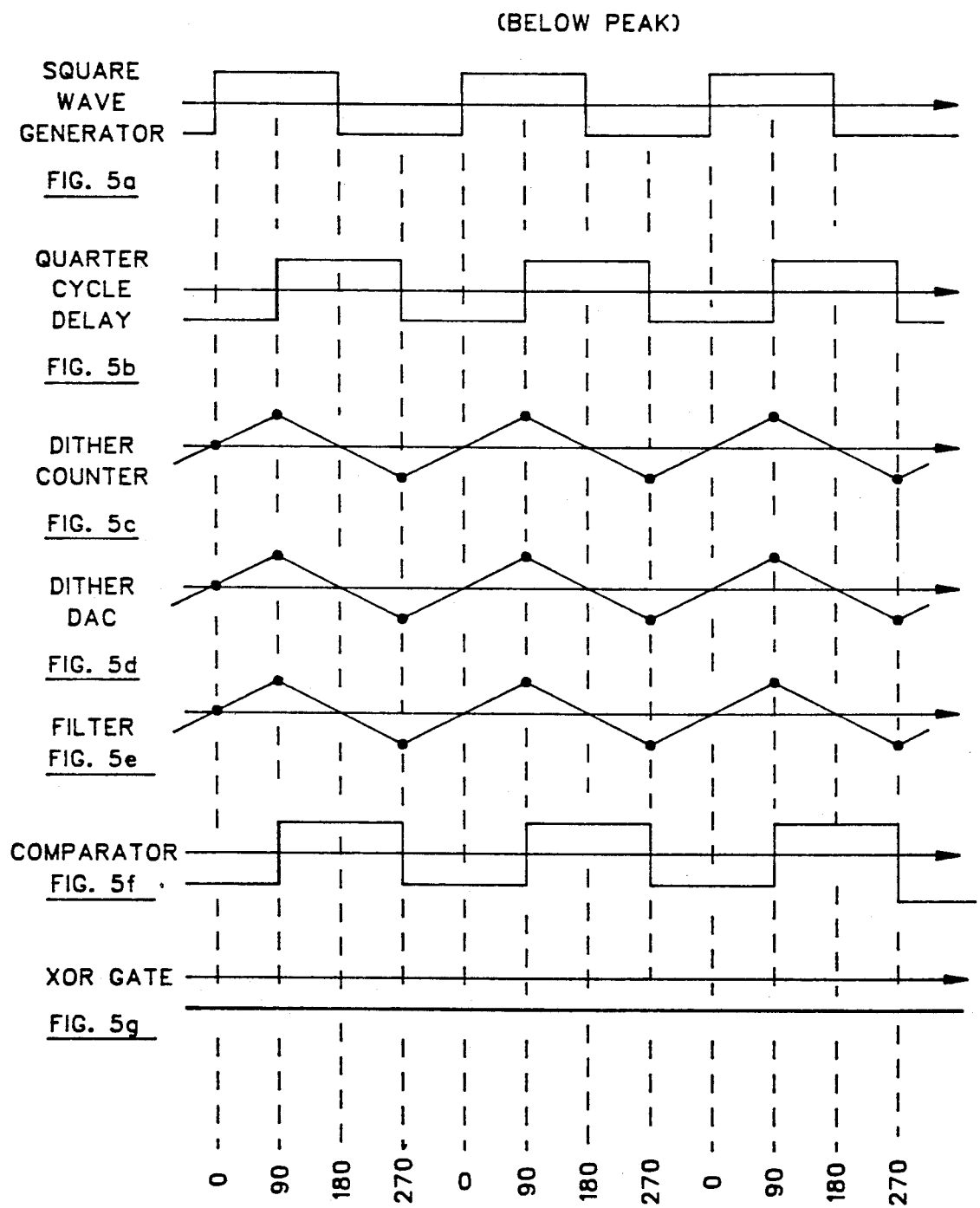

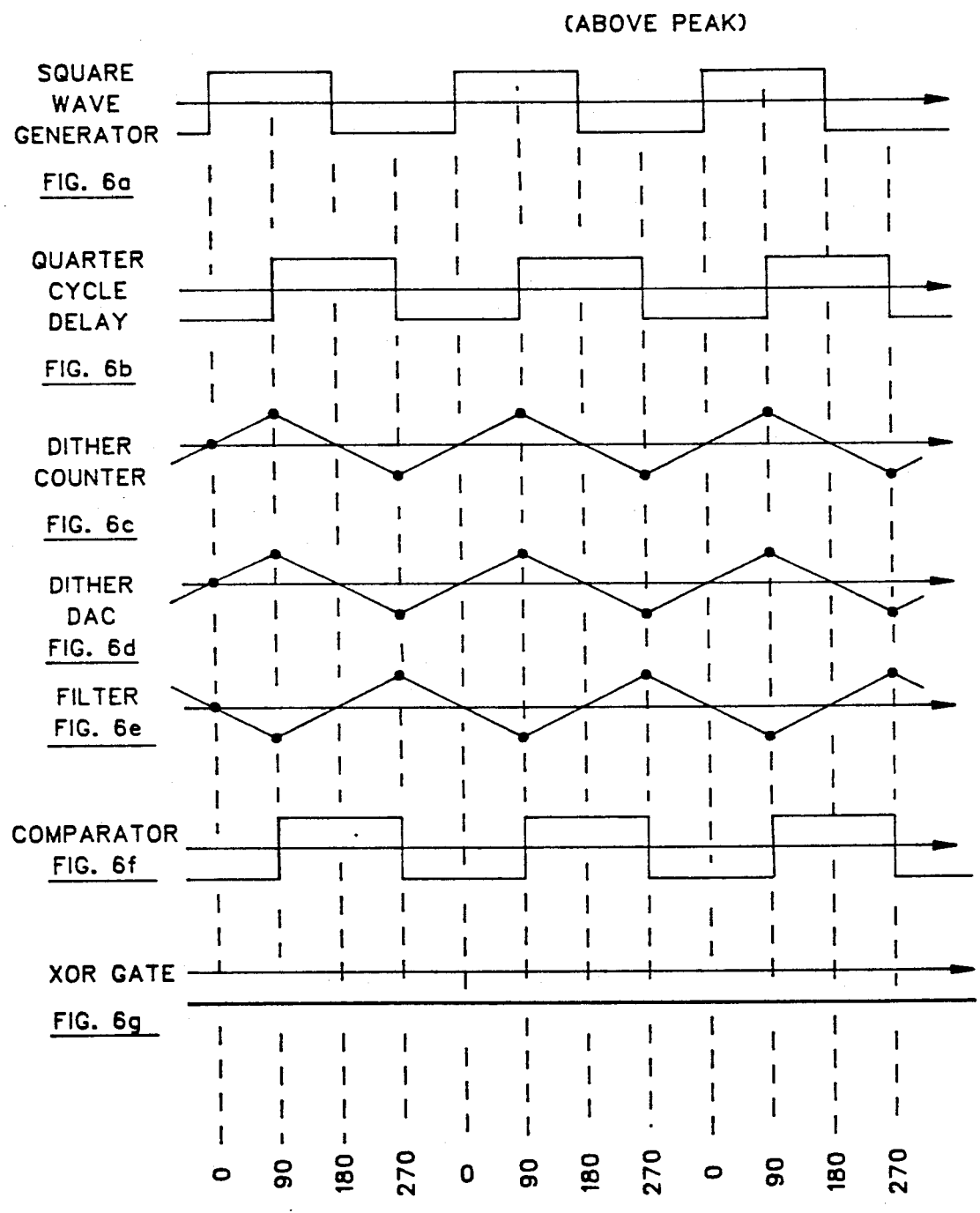

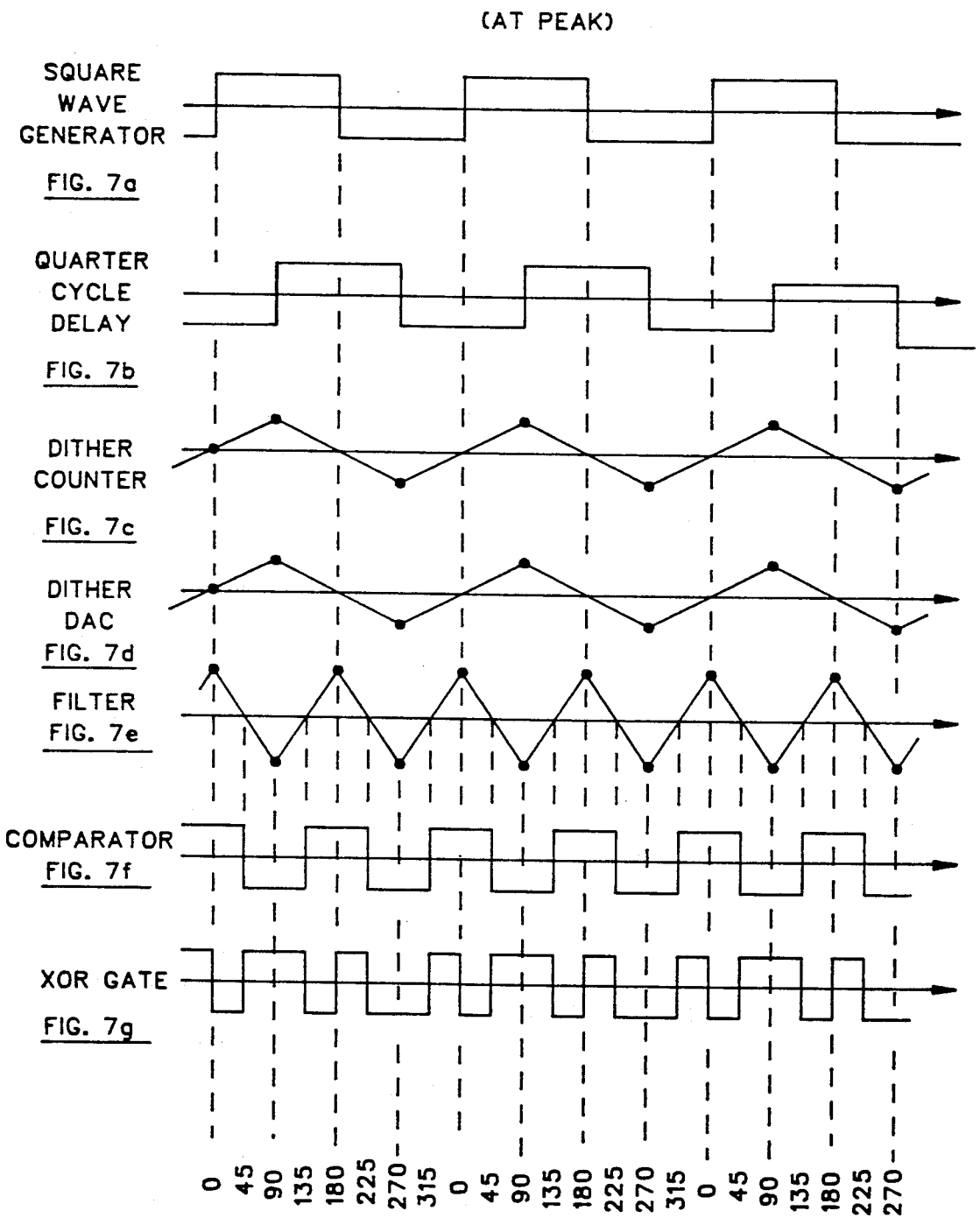

DIGITAL PATH LENGTH CONTROL FOR RING LASER GYROS

BACKGROUND OF THE INVENTION

This invention relates to means for controlling the path length of a ring laser gyro, and has particular relation to such means which are as completely digital as possible.

In a ring laser gyro (RLG), an optical ring is formed, and two laser beams are directed around the ring in opposite directions. When the beams are combined, rotation of the ring appears as an interference shift in the combined beams.

It is apparent that precise control must be maintained over the optical length of the path which the beams take around the ring. The conventional method is analog dithering. Referring now to FIG. 1, the intensity of the light produced by a laser is schematically plotted as a function of the path length of the RLG. At point 10, the path length is too short for the laser to produce its maximum output; at point 12 it is too long; and at point 14 it is just right.

The path length of an RLG can easily be controlled by controlling the position of one (or more) of the mirrors which bounce the laser beams around the ring. This may most conveniently be accomplished by placing a piezoelectric transducer (PZT) on the back of the mirror, and controlling the thickness of the PZT by controlling the voltage which is fed to the PZT. If the RLG is operating at point 10, then the voltage to the PZT is increased; if the RLG is operating at point 12, the voltage is decreased; and if the RLG is operating at point 14, the voltage is kept constant. The PZT is constructed such that increasing the voltage makes the PZT thinner, which (since the PZT is on the back of the mirror) increases the path length. Decreasing the voltage decreases the path length. Voltage polarity, PZT position, and PZT operation (increased voltage makes it thicker) may be reversed in pairs if convenient.

Dithering is used to determine the point at which the RLG is operating. Dithering is the application of a small AC sinusoidal voltage signal to the PZT, causing the path length of the RLG to likewise vary sinusoidally. Turning now to FIG. 2, the operation of dithering is shown. If the RLG was operating at point 10 without dithering, then it will operate at point 16 and 18, and at every point in between, with dithering. If the RLG was operating at point 12 without dithering, it will instead operate between points 20 and 22; and, if previously operating at point 14, it will now operate between points 24 and 26.

Turning now to FIGS. 3a-3d, the effects of dithering are shown. As is seen in FIG. 3a, the dithering voltage (and consequent PZT position) begins with its average value at point 28, increases to its maximum at point 30, returns to its average value at point 32, falls to its minimum at point 34, and again returns to its average value at point 36.

FIG. 3b shows the concurrent fluctuations of the laser beam's intensity if the RLG is operating at point 10, that is, if the path length is under the length required for peak intensity. Increasing the dithering voltage to point 30 increases the under peak intensity to point 18, and decreasing the dithering voltage through the neutral point 32 to the minimum point 34 causes the under peak intensity to drop from its maximum 18 back through neutral point 10 and to minimum point 16. The voltage and the under peak intensity are in phase.

Conversely, the over peak intensity is out of phase with the dithering voltage, as is shown in FIG. 3c. Increasing the voltage (and PZT position) from point 28 to point 30 causes the over peak intensity to drop from operating point 12 to operating point 22, and decreasing it through point 32 to point 34 causes the intensity to rise through point 12 to point 20. See FIG. 2.

If the RLG is operating at its peak, rather than either under or over its peak, then moving it from operating point 14 to either operating point 26 (voltage point 30) or operating point 24 (voltage point 34) will cause the peak intensity to drop from its maximum to its minimum. See FIG. 2 and FIG. 3d. Instead of being either in phase or out of phase with the dithering voltage, the peak intensity modulates with a frequency twice that of the dithering voltage.

Because the gain curve shown in FIGS. 1 and 2 is relatively flat at the peak 14, in comparison with the sides 10 and 12, the amplitude of modulation of the light intensity is less when the RLG is operating at its peak, in comparison to when it is operating with a path length which is either under or over the peak path length. The modulations at peak are therefore more difficult to detect.

The prior art uses analog components to form a phase comparator, into which is fed the dithering voltage and a pick-off voltage, that is, the voltage produced by a photodetector actuated by a small sample of light which has been picked off from the laser beam. If the two signals are in phase, then the voltage to the PZT is increased; if they are out of phase, it is decreased.

An analog phase comparator and voltage feedback device suffers from the drawbacks of analog devices generally: radiation softness, bulk, weight, lack of tolerance for variation in component parameters, and the like.

It is an objective of the present invention to minimize the use of analog components.

It is a feature of the present invention that it uses analog components only when interfacing with the laser beam, i.e., at the PZT and around the photodetector. The output from the photodetector is first amplified to a useful level, is then band-pass filtered to eliminate both the inevitable noise which is present at frequencies higher than the highest frequency of interest (the modulation frequency when the RLG is operating at its peak [see FIG. 3, bottom line]) and any dc component, and is then immediately fed into a specially designed analog-to-digital converter (ADC). Likewise, the PZT is driven directly by a digital-to-analog converter (DAC).

It is an advantage of the present invention that signal processing takes place between the ADC and the DAC and is entirely digital.

BRIEF DESCRIPTION OF THE DRAWINGS

These and other objectives, features, and advantages will become apparent upon viewing the drawings, in which:

FIGS. 5a-5g shows the signals present at various significant points of the apparatus over three square wave cycles, when the invention is operating below peak path length.

FIGS. 6a-6g are similar to FIGS. 5a-5g except that the invention is operating at above peak path length.

FIGS. 7a-7g are similar to FIGS. 5a-5g and 6a-6g except that the invention is operating at peak path length.

DETAILED DESCRIPTION OF A PREFERRED EMBODIMENT

FIGS. 1, 2, and 3a-3d have been discussed in the foregoing discussion of the BACKGROUND OF THE INVENTION, and will not be further described here.

Figure 1:
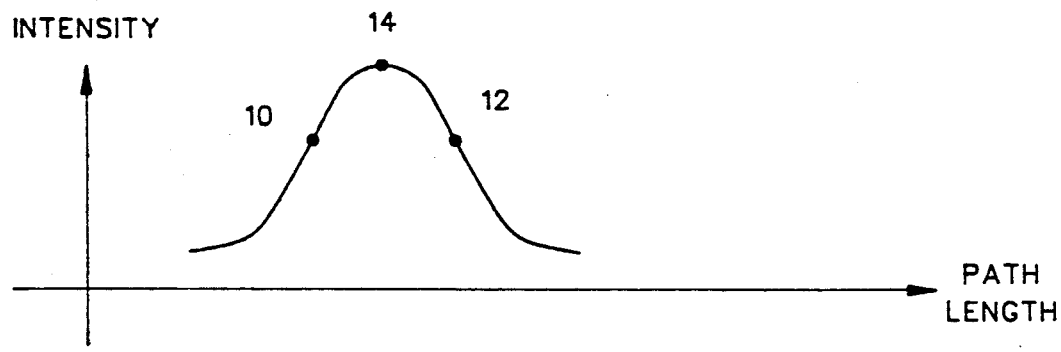
FIG. 1 shows a gain curve, with three operating points.
Figure 2:
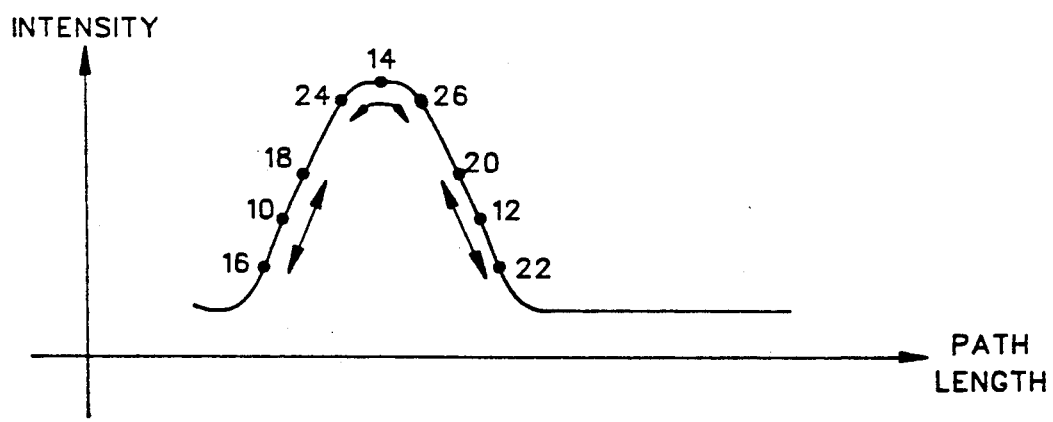
FIG. 2 is similar to FIG. 1, and shows the effects of dithering.
Figure 3A:
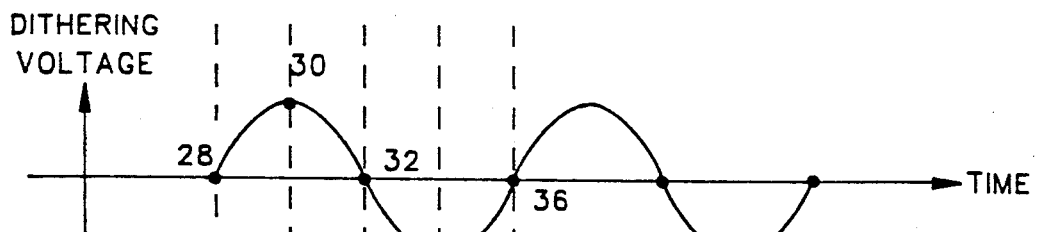
FIG. 3a shows an input dithering voltage, and FIGS. 3b, 3c and 3d the resulting intensity of the light at the three operating points shown in FIG. 2.
Figure 3B:
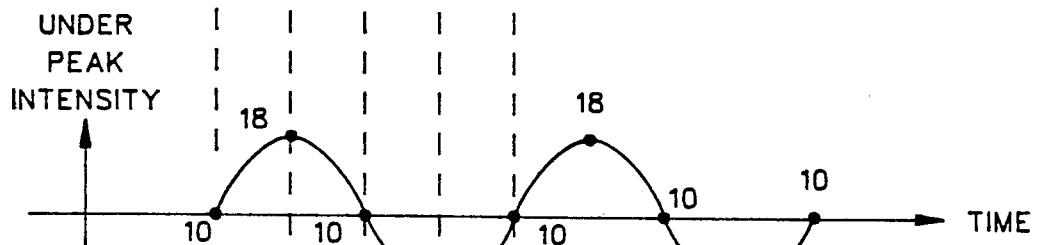
Figure 3C:
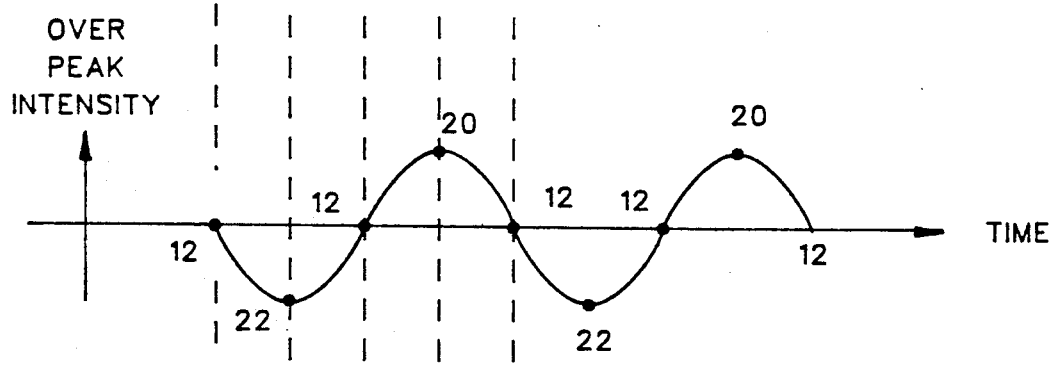
Figure 3D:
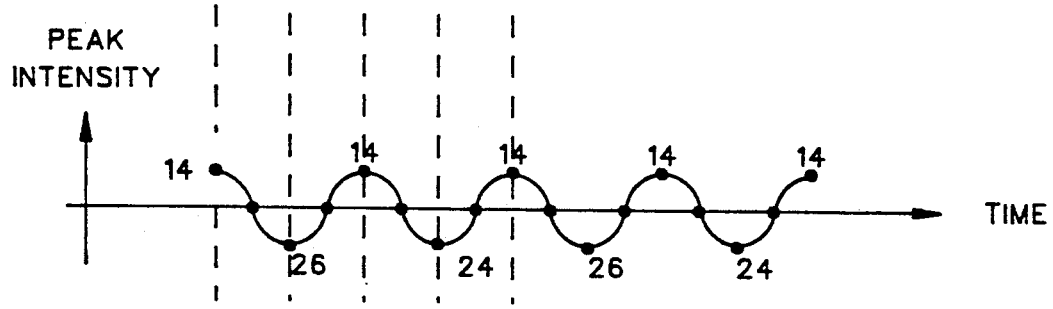
Figure 4:
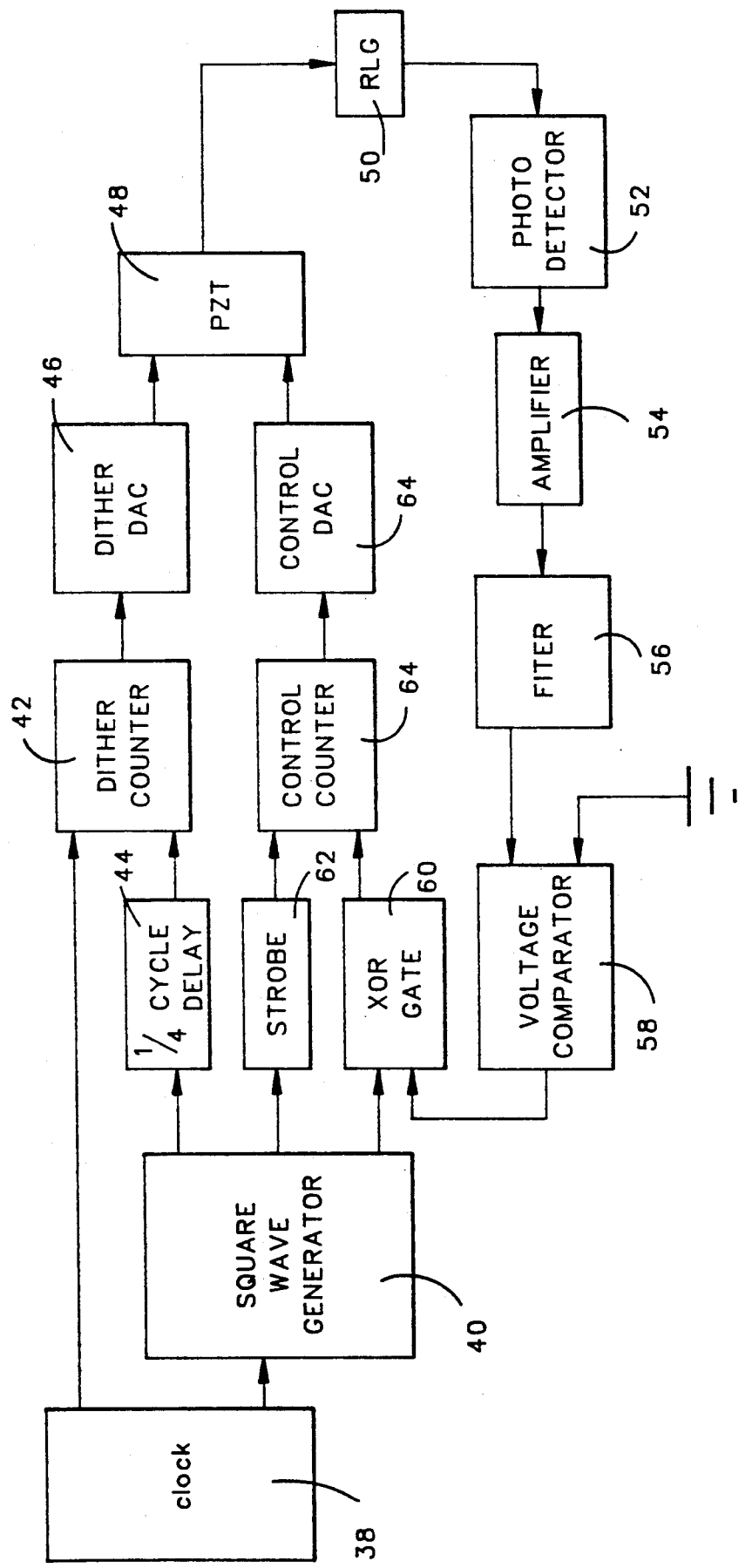
FIG. 4 is a schematic block diagram of the present invention.

FIG. 4 and FIGS. 5a-5g should be viewed together when reading the following description. FIG. 4 shows, in block form, the components of the apparatus of the present invention, and how they are connected to one another. FIGS. 5a-5g shows the ideal waveform which is present at the output of each of the more noteworthy components of FIG. 4, at least when operating around point 10, below peak path length.

The first necessity is to establish a digital dither signal. The most convenient way is with a counter, which increments by one each clock cycle when its control input is logic 0, and decrements by one when its control input is logic 1. As shown in FIG. 4, a clock 38 drives both a square wave generator 40 and a dither counter 42. The dither counter 42 is also driven by the square wave generator 40, but the signal from the square wave generator 40 is first passed through a quarter-cycle delay apparatus 44, the purpose of which is described below.

FIG. 5a-5b display voltage versus time. The output of the square wave generator 40 is shown in FIG. 5a, and the output of the quarter-cycle delay apparatus 44 is shown on FIG. 5b.

In FIGS. 5a-5g, time increases to the right, so FIG. 6b is the same as FIG. 5a but is shifted a quarter cycle to the right.

FIG. 5c shows number versus time, and shows the digital number which is output from the dither counter 42. For as long as the signal from the quarter cycle delay apparatus 44 is logic 1, the dither counter 42 decrements by one each clock cycle, and its output therefore shows a descending ramp. For as long as the signal from the quarter cycle delay apparatus 44 is logic 0, the dither counter 42 increments by one each clock cycle, and its output therefore shows a descending ramp. The clock signal itself is not shown in FIGS. 5a-5g, since there should be a large multiplicity of clock pulses for each square wave pulse. Applicant, for example, prefers to drive the clock at a frequency of $2^{13} \times 1.5$ khz, while the square wave itself has a frequency of only 1.5 khz. This large number of clock pulses cannot be shown on FIGS. 5a-5g, and makes its presence felt in the smooth ramps of FIG. 5c, rather than having these ramps being stair steps.

The dither counter 42 drives a dither DAC 46 (FIG. 4), the output of which is shown in FIG. 5d. It will be noted that FIG. 5d is identical to FIG. 5c, except that it measures voltage versus time rather than number versus time. It will also be noted that there is no horizontal axis to either FIG. 5c or FIG. 5d.

The dither DAC 46 in turn drives a PZT 48, which modulates the path length of the RLG 50. Since the dither DAC 46 produces a triangular wave, the PZT 50 also moves in a triangular wave rather than in a sine wave, as is typical in an analog device. The resulting modulation of the laser beam's intensity is, therefore, also a triangular wave. This triangular wave is not only more easily produced than is a sine wave, as has been shown above; it also has a more sharply defined peak than does a sine wave. This more sharply defined peak facilitates the task of actively controlling the path length of the RLG 50.

A photodetector 52 samples a picked off portion of the laser beam propagating in the RLG 50. This signal from the photodetector 52 is amplified by amplifier 54, and is then band-pass filtered by filter 56. The filter 56 produces the signal shown on FIG. 5e, which displays voltage versus time. The horizontal axis of FIG. 5e is drawn to emphasize the fact that the combination of photodetector 52, amplifier 54, and filter 56 is constructed to produce a voltage signal which has an average value of zero. It will be noted that the waveform shown in FIG. 5e is the same as that shown in FIGS. 5c and 5d.

As has been pointed out above, the highest frequency of interest is the frequency detected by the photodetector 52 when the RLG 50 is operating at the peak intensity point 14, i.e., twice the modulation frequency of the signal produced by the square wave generator 40. Noise is generally of a higher frequency, and is eliminated by the band-pass filter 56. The low end of the band-pass filter 56 may be conveniently set at one fifth of the modulation frequency of the signal produced by the square wave generator 40. This will eliminate any dc component without excessively affecting the square wave frequency. If desired, the band-pass filter 56 may be replaced with a double band-pass filter, passing only the frequency produced by the square wave generator 40 and twice that frequency. Such measures are generally not necessary.

The output of the band-pass filter 56 is fed to a voltage comparator 58. The voltage comparator 58 compares the output of the filter 56 with ground. It produces a logic 1 when the filter output is positive with respect to ground, and produces a logic 0 when the filter output is negative with respect to ground. Since the filter output is centered on 0 volts, the voltage comparator 58 produces a square wave, as is shown in FIG. 5f. However, since the filter output is a triangular wave (FIG. 5e), it crosses the zero voltage horizontal axis a quarter cycle out of phase with the quarter cycle delay apparatus (FIG. 5b) which ultimately produced it. However, it is exactly in phase with the output (FIG. 5a) of the square wave generator 40 which drives the quarter cycle delay apparatus 44. Thus, the square wave generated by the voltage comparator 58 is exactly in phase with the square wave generated by the square wave generator 40.

The square wave generator 40 and the voltage comparator 58 thus both produce digital square waves, as is shown in FIGS. 5a and 5f. These two signals are fed to the two inputs to an XOR gate 60, as shown in FIG. 4. These two signals are in phase (FIGS. 5a and 5f), so the XOR gate 60 produces a steady logic 0 (FIG. 5g.). This summarizes the situation when the RLG 50 is operating below peak path length.

When the RLG 50 is operating above peak path length, the situation changes. FIGS. 6a-6g show this situation and are similar to FIGS. 5a-5g. The output of the square wave generator 40 is unchanged, but the outputs of the band-pass filter 56 (FIG. 6d, line four), and, thus, of the comparator 58 (FIG. 6f) are inverted. The XOR gate 60 therefore produces a steady logic 1 (FIG. 6g line seven).

When the RLG 50 is operating at peak intensity path length the situation is more complex. FIGS. 7a-7g shows this situation and are similar to FIGS. 5a-5g and 6a-6g. Again the output of the square wave generator 40 is unchanged, but in this situation, just as in the analog apparatus (FIG. 3d), the band-pass filter voltage modulates at twice the frequency of the PZT 48 (FIG. 5d). The comparator 58 therefore produces a square wave of twice the frequency, as is shown in the FIG. 7f. The output of the XOR gate 60 (FIG. 7g) may be constructed from a comparison of FIGS. 7a and 7f.

As has been pointed out above, the XOR gate 60 produces a steady logic 0 when the path length is too short, and produces a steady logic 1 when it is too long. A transient may appear at each end of the dithering cycle (at 0° and 180°, as shown on the bottom line of numbers of FIGS. 5a-5g and 6a-6g), but will occupy only a small portion of each cycle. Almost any scheme for sampling the output of the XOR gate 60 will, therefore, function effectively when the RLG path length is either too long or too short. The output of the XOR gate 60 may thus be fed back into the control loop with confidence that active stabilization of the path length will take place.

It is apparent, however, that the sampling scheme must produce as many logic 1s as it does logic 0s when the RLG is operating at peak intensity. It is therefore necessary to sample with at least twice the frequency of the square wave generator 40 (once when the square wave generator 40 is at logic 1 [90°], and once when it is at logic 0 [270°]). Applicant prefers to sample at four times the square wave generator frequency in order to satisfy the Nyquist criterion: sample at a minimum of twice the frequency of the highest frequency of interest.

This may be accomplished by stepping down the clock frequency within the square wave generator 40 in two stages: a divide-by-n/4 stage, which in turn drives a divide-by-4 stage. The output of the divide-by-n/4 stage is passed through directly to a strobe 62, while the output of the divide-by-4 stage drives the XOR gate 60 and the quarter cycle delay apparatus 44.

Sampling at 65°, 155°, 245°, and 335° is suitable. In practice, manually adjusting the phase of the strobe 62 until the RLG 50 stabilizes is a quick and convenient method of selecting the operating strobe phase.

The feedback signal produced by the XOR gate 60 drives a control counter 64, which decrements by one with each pulse from the strobe 62 when the signal produced by the XOR gate 60 is a logic 0, and increments by one with each pulse when it is a logic 1. This is the reverse of the operation of the dither counter 42, as is to be expected in a negative feedback control loop. The control counter 64 drives a control DAC 66, which outputs its voltage to one of the terminals of the PZT 48. It will be recalled that the other terminal of the PZT 48 is driven by the dither DAC 46. The thickness of the PZT 48 (and consequent position of the mirror controlling the path length of the RLG 50) does not depend on the absolute or average voltage impressed on its terminals, but on the voltage difference between them. Thus, the single PZT 48 responds both to the dither DAC 46 and the control DAC 66.

The control counter 64 may be initialized such that the voltage produced by the control DAC 66 is less than the voltage produced by the dither DAC 46. Thus, when the path length is too short, the XOR gate 60 produces a logic 0. This causes the control counter 66 to decrement, which causes the output voltage of the control DAC 66 to drop, which increases the voltage difference between the output of the control DAC 66 and the dither DAC 46. The PZT 48 therefore gets thinner, increasing the path length of the RLG 50, which is the desired result. Provided that the PZT 48 is connected with the correct polarity, the same feedback will occur even when the control DAC 66 produces a voltage greater than that produced by the dither DAC 46. A similar feedback occurs when the path length is too long.

The PZT 48 must be sensitive enough, in response to the low voltage dither produced by the dither counter 42 and dither DAC 46, to produce the minor changes in path length needed to drive the intensity up and down the side of the gain curve. This path length change is considerably less than a wavelength of the laser beam. At the same time, the PZT 48 must be able, in response to the control counter 64 and control DAC 66, to compensate for the much greater change in the path length of the RLG 50 as it warms up, is subjected to radiation, and otherwise settles into its operating condition. This may be a large number of wavelengths of the laser beam, each wavelength having one or two gain peaks.

It is generally desirable to select a gain peak which is in the middle of the operating range of the PZT 48 when the RLG 50 is under operating conditions. This gain peak may or may not be in the middle of the operating range at start up conditions. However, both the actual starting conditions and the anticipated operating conditions will be known at start up. Therefore, a gain peak may be selected at some distance from the middle of the start up operating range, since this gain peak will move into the middle of the operating range as the RLG 50 settles into its operating condition. It is apparent that the control counter 66 may be initialized with a number which selects the appropriate gain peak, which may be determined by trial and error, if necessary.

The foregoing description has been in terms of triangular waves. If desired, the counters 42 and 64 may be modified to produce sine waves, or waves of any other desired shape. A look-up table, for example, could be incorporated into the counters 42 and 64 to translate raw triangular-wave numbers into whatever numbers are required to produce the desired wave.

The foregoing description describes a control apparatus for the optical path length of a ring laser gyro which is entirely digital, except where it must interface with the light beam, that is, at the mirror and at the photo detector. The digital components described are each, in isolation, entirely conventional and well proven, and are both more reliable and more robust, especially in a high radiation environment, than are the alternative analog components.

INDUSTRIAL APPLICABILITY

The present invention is capable of exploitation in industry, and can be used, whenever it is desired to control the path length of a ring laser gyro without using analog components. In can be made from components which are, individually, entirely conventional, or it can be made from their non-conventional counterparts.

While a particular embodiment of the present invention has been described above, the true scope and spirit of the present invention is not limited to this embodiment, but is limited only by the appended claims.

What is claimed is:

1. Apparatus for digitally controlling the path length of a ring laser gyro having a path length, comprising:
   (a) a square wave generator;
   (b) a dither counter, driven by the square wave generator through a quarter-cycle delay apparatus, and incrementing or decrementing with each pulse of a clock;
   (c) a dither DAC driven by the dither counter;
   (d) a PZT having a dither terminal and a control terminal, the dither terminal being driven by the dither DAC, and the PZT controlling the path length of the ring laser gyro;
   (e) a photodetector, detecting the intensity of the light propagating in the ring laser gyro;
   (f) an amplifier driven by the photodetector;
   (g) a band-pass filter, driven by the amplifier, and constructed to pass frequencies below twice the frequency of the square wave generator, to eliminate dc, and to produce an ac voltage signal;
   (h) a voltage comparator, comparing the output of the filter with ground, and producing an output;
   (i) a two-terminal XOR gate, one terminal being driven by the output of the voltage comparator and the other terminal being driven by the square wave generator;
   (j) a control counter, driven by the XOR gate, and incrementing or decrementing with each pulse of a strobe which operates with at least twice the frequency of the square wave generator; and
   (k) a control DAC, driven by the control counter, and driving the control terminal of the PZT.

2. A method for digitally controlling the path length of a ring laser gyro having a path length, comprising:
   (a) generating a square wave;
   (b) delaying the square wave by a quarter cycle;
   (c) incrementing or decrementing a dither number, in response to the delayed square wave, with each pulse of a clock signal;
   (d) converting the dither number to a dither voltage;
   (e) driving a dither terminal of a PZT with the dither voltage, the PZT also having a control terminal, and the PZT controlling the path length of the ring laser gyro;
   (f) detecting the intensity of the light propagating in the ring laser gyro;
   (g) converting the detected intensity of the light into a voltage signal;
   (h) amplifying the voltage signal;
   (i) band-pass filtering the amplified voltage by passing frequencies below twice the frequency of the square wave generator and eliminating dc, and producing an ac voltage signal;
   (j) comparing the ac voltage signal with ground, and producing a comparator output;
   (k) XORing the comparator output with the square wave and producing an XOR output;
   (l) incrementing or decrementing a control number, in response to the XOR output, with each pulse of a strobe signal which operates with at least twice the frequency of the square wave;
   (m) converting the control number to a control voltage; and
   (n) driving the control terminal of the PZT with the control voltage.

3. Means for digitally controlling the path length of a ring laser gyro having a path length, comprising:
   (a) means for generating a square wave;
   (b) means for delaying the square wave by a quarter cycle;
   (c) means for incrementing or decrementing a dither number, in response to the delayed square wave, with each pulse of a clock signal;
   (d) means for converting the dither number to a dither voltage;
   (e) means for driving a dither terminal of a PZT with the dither voltage, the PZT also having a control terminal, and the PZT controlling the path length of the ring laser gyro;
   (f) means for detecting the intensity of the light propagating in the ring laser gyro;
   (g) means for converting the detected intensity of the light into a voltage signal;
   (h) means for amplifying the voltage signal;
   (i) means for band-pass filtering the amplified voltage by passing frequencies below twice the frequency of the square wave generator, eliminating dc, and producing an ac voltage signal;
   (j) means for comparing the ac voltage signal with ground and producing a comparator output;
   (k) means for XORing the comparator output with the square wave and producing an XOR output;
   (l) means for incrementing or decrementing a control number, in response to the XOR output, with each pulse of a strobe signal which operates with at least twice the frequency of the square wave;
   (m) means for converting the control number to a control voltage; and
   (n) means for driving the control terminal of the PZT with the control voltage.

* * * * *